Feb. 27, 1968     K. P. STANABACK     3,370,665
TANDEM AXLE VEHICLE

Filed Oct. 21, 1965     2 Sheets-Sheet 1

INVENTOR.
KENNETH P. STANABACK

BY

ATTORNEYS

Feb. 27, 1968　　　K. P. STANABACK　　　3,370,665
TANDEM AXLE VEHICLE
Filed Oct. 21, 1965　　　　　　　　　　2 Sheets-Sheet 2

INVENTOR.
KENNETH P. STANABACK
BY
ATTORNEYS

United States Patent Office 3,370,665
Patented Feb. 27, 1968

3,370,665
TANDEM AXLE VEHICLE
Kenneth P. Stanaback, 3640 Breton Road SE.,
Grand Rapids, Mich. 49508
Filed Oct. 21, 1965, Ser. No. 499,230
5 Claims. (Cl. 180—22)

ABSTRACT OF THE DISCLOSURE

A powered, tandem axle, tiltable, cycle-type vehicle having a steerable front wheel assembly, and an H-shaped tandem rear axle assembly with forward and rearward axle units, each axle unit having a shaft and a bearing sleeve forming the legs of the H, and a trunnion connecting the legs as the H cross member; the trunnion ends having coaxial bearing connections to the sleeves and its center having a transverse bearing connection to the vehicle frame, with resilient biasing means between the trunnion and sleeves for upright stability.

This invention relates to a vehicle, and more particularly to an engine powered cycle.

Cycle-type vehicles assume a variety of different forms and constructions, each designed to suit a particular type of terrain. Some are capable of leaning, thereby providing stability and maneuverability on curves and at higher speeds. Some, like the three wheeled motorcycle, have better stability at low speeds and on slippery streets. Some are very rugged in construction for overland usage as for hunting. Some have special wheels such as balloon tires or tracks for snow, sand or mud.

Each type of vehicle has definite advantages for traversing the certain type of surface, but definite disadvantages and limitations when employed elsewhere.

It is an object of this invention to provide a unique cycle having excellent operating characteristics on several different types of surfaces or terrains, whether hard or soft, dry or wet, snow or ice covered, muddy or sandy, and at any different speeds.

Another object of this invention is to provide a novel cycle which provides the corner and curve stability of a leaning two wheeler vehicle, while also having the upright stability of three wheeled vehicles on slippery or snow covered surfaces or at low speeds. The unit, furthermore, has excellent traction for soft, muddy, wet or sandy areas and on snow or ice.

Another object of this invention is to provide a unique cycle having the traction and stability of a multi-wheeled vehicle and the maneuverability of a two wheeled cycle.

Another object of this invention is to provide a novel cycle capable of safe, reasonable, year around usage for overland operation or for use on streets.

Another object of this invention is to provide a cycle type vehicle having a unique drive and suspension system providing maximum manueverability, stability, adaptability to terrain and riding comfort.

These and several other objects of this invention will become apparent upon studying the following specification in conjunction with the drawings in which.

Figure 1:
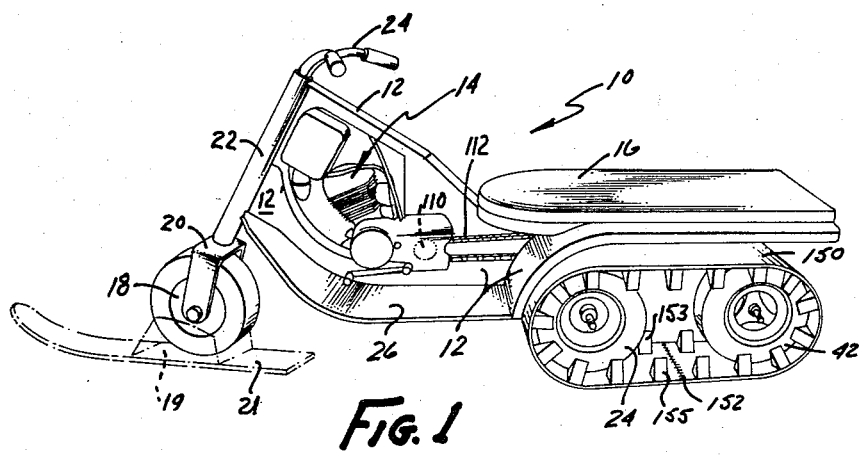
FIG. 1 is a perspective view of the novel vehicle, shown with endless tracks attached to the wheels.

Referring now specifically to the drawings, the cycle 10 has a support frame 12 extending from front to rear, mounting an internal combustion engine 14 of conventional type adjacent the front thereof, and supporting a seat 16 for passengers. Astraddle engine 14 and in front of seat 16 is a pair of foot rests 26. Frame 12 includes a rearwardly extending beam 12' on its underside. Secured to the front of frame 12 is a conventional front end assembly. This includes a front wheel 18 rotationally mounted to support fork 20. Fork 20 has a steering shaft extending up through fixed cylindrical collar 22, with handle bars 24 secured to the top end of the shaft.

Beneath the rear of the frame is a unique rear suspension and drive assembly which includes a forward axle unit and a rearward axle unit in tandem relation. The forward transverse axle 30 has a pair of wheels 32 and 34 with tires mounted on opposite ends, and is rotatably supported in a transverse forward bearing sleeve 36. Rearward transverse axle 38 has a pair of wheels 40 and 42 with tires mounted on its opposite ends, and is rotationally supported in a transverse rearward bearing sleeve 44.

Figure 2:
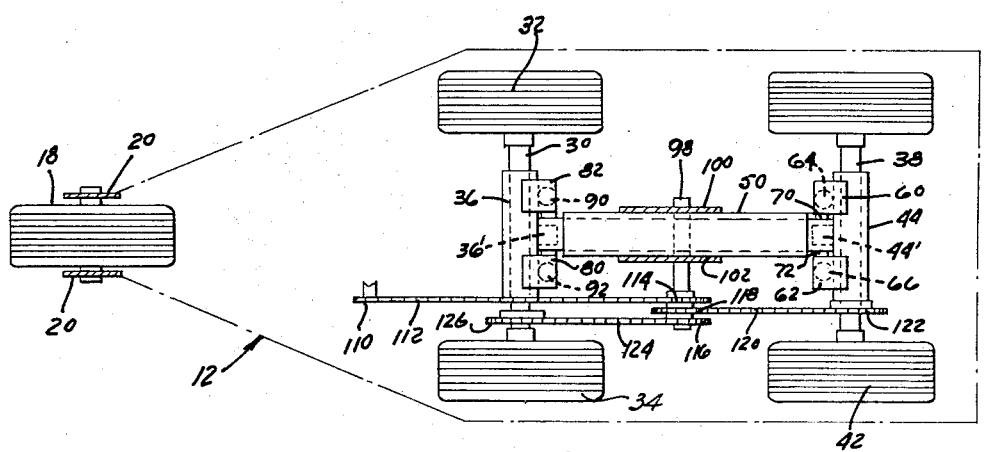
FIG. 2 is a plan view of the drive and suspension assembly of the vehicle, showing the body configuration in phantom outline form.
Figure 3:
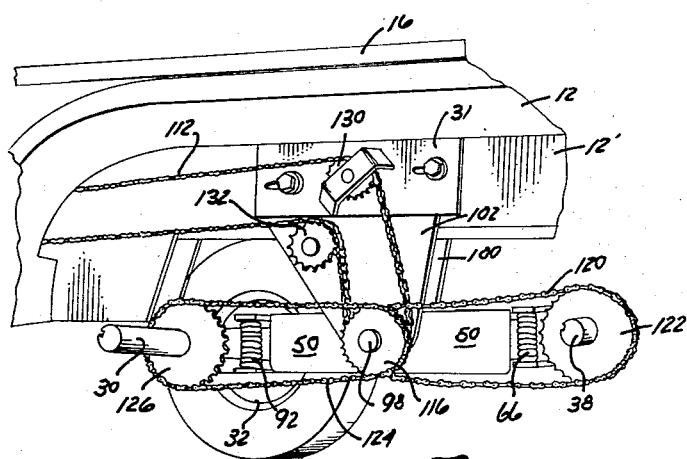
FIG. 3 is an enlarged, fragmentary, perspective view of a portion of the drive and suspension assembly of the vehicle.
Figure 4:
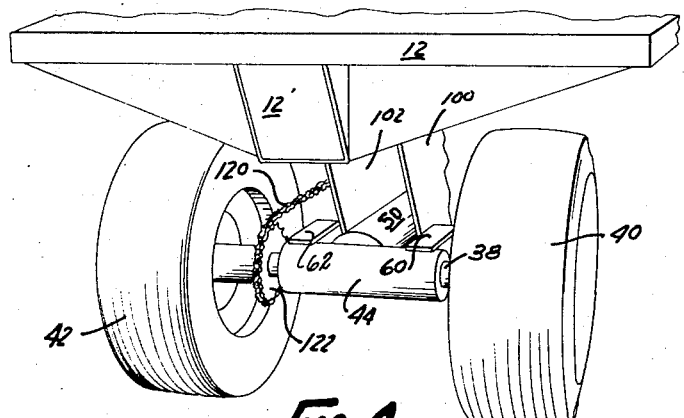
FIG. 4 is a fragmentary, enlarged, perspective view of the rear of the vehicle, showing particularly the rearward axle unit.
Figure 6:
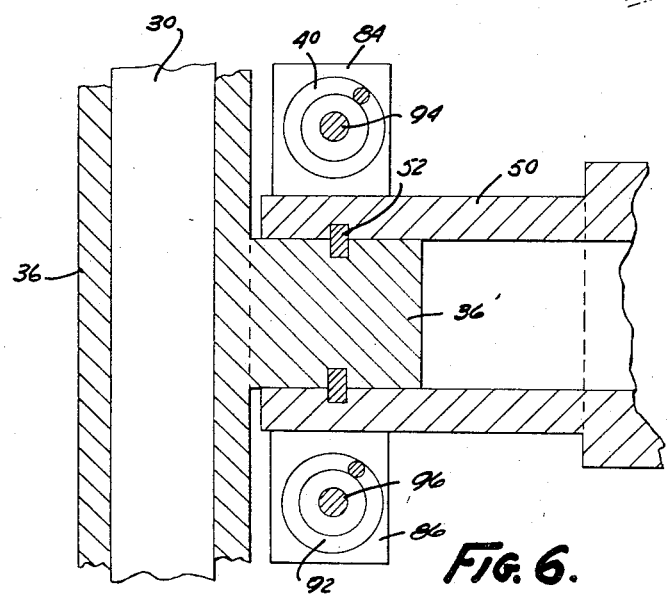
FIG. 6 is an enlarged, sectional view through the center of the juncture of the front axle assembly with the central trunnion of the suspension assembly, taken on a horizontal plane.

Extending forwardly and rearwardly between the centers of these two parallel bearing sleeves 36 and 44 is a cylindrical mounting trunnion 50 that mounts both sleeves. More specifically, received within the forward end of trunnion 50 is a rearwardly projecting, cylindrical pivot stub shaft 36' that is affixedly secured to sleeve 36 (FIG. 6). This provides a rotational connection between these two elements on a front to rear axis with respect to the longitudinal dimension of the vehicle, in line with the center of the vehicle and its front wheel. The members of this swivel connection are axially retained together by suitable means such as peripheral key 52. The hollow rear end of trunnion 50 has a like connection with the trunnion sleeve receiving and retaining a forwardly extending stub shaft 44' from bearing sleeve 44 (FIG. 2). This connection also appears just like that in FIG. 6. Thus, both the rearward axle assembly and the forward axle assembly can pivot independently with respect to the trunnion to tilt in arcs lying in transverse planes normal to the trunnion axis. As shown, each swivel connection has a simple surface contact bearing means. This may be substituted by a more complex, low friction bearing such as a roller bearing if desired.

Figure 5:
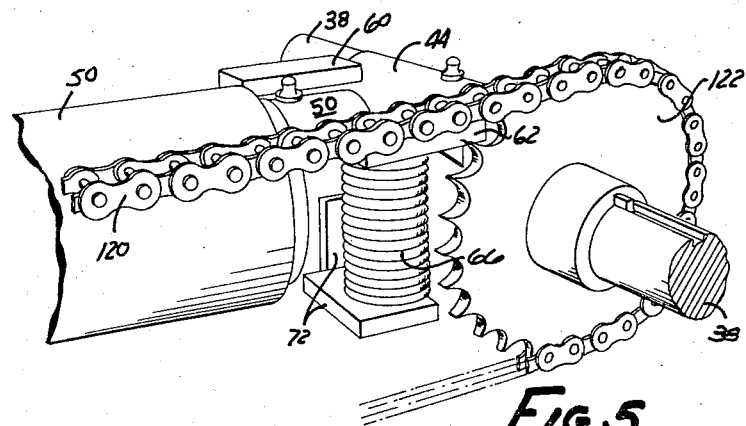
FIG. 5 is an enlarged, perspective, fragmentary view of the front of the rearward axle unit of the assembly.

This pivotal relationship of each axle assembly is controlled within definite limits. The control is achieved by double, straddling compression springs and retainers between each end of the trunnion, and the respective axle bearing sleeves. More specifically, referring particularly to FIGS. 2, 5 and 6, a pair of upper, rigid, forwardly extending, retainer abutment plates 60 and 62 are affixed on their rearward ends to bearing sleeve 44, astraddle the rear end portion of trunnion 50. A pair of coil springs 64 and 66 extend vertically down from these plates to a pair of cooperative lower fixed retainer abutment plates 70 and 72 affixed securely to the rear end of trunnion 50 and extend laterally or radially therefrom. Hence, rotation of the rearward axle assembly in either direction is resisted and limited by the compression of these coil springs between the plates. The springs may be retained in place as by suitable studs that extend down through the plates and through the springs. (See studs 94 and 96 for the front springs 90 and 92 in FIG. 6.)

The front axle assembly is likewise retained in its pivotal relationship to the trunnion by a pair of rearwardly extending upper, spring-retaining, abutment plates 80 and 82 (FIG. 2) which are affixed to sleeve 36 and cooperate with a pair of lower, laterally extending abutment plates 84 and 86 (FIG. 6) affixed to trunnion 50 to receive therebetween a pair of compression coil springs 90 and 92. These springs may be retained in place by a pair of suitable studs 94 and 96 (FIG. 6) extending through the springs. These compression coil springs could be substituted by compressible elements as of rubber or the like. Also, the springs could be counteracting tension springs instead of compression springs, or could be both.

The central portion of trunnion 50 is pivotally mounted on a transverse pivot axis to a shaft 98 suspended between a pair of depending straddle brackets 100 and 102. The upper ends of brackets 100 and 102 are affixed to and depend from beam 12' of frame 12. This pivotal connection enables the forward axle unit to move vertically with downward movement of the rearward axle, and vice versa, independently of the pivoting movement of the forward and rearward axle units in their transverse planes with respect to the trunnion.

The four wheels of the dual tandem axle units provide a stable construction which normally retains the vehicle upright even when moving slowly or standing still. They also enable the vehicle to tilt on curves or the like, however, during movement. They also enable it to cover relatively rough terrain without loss of traction.

Preferably, both axles of the tandem axle assembly are power driven. More specifically, output sprocket 110 from the engine (FIG. 2) drives an endless member such as chain 112, which in turn drives a sprocket 114 rotationally mounted on pivot shaft 98. Also mounted on this same shaft is first driven sprocket 116 and second driven sprocket 118. Sprockets 114, 116 and 118 are intermediate sprocket means. A chain 120 extends around sprocket 118 to another sprocket 122 mounted on the rearward axle. Chain 124 extends around sprocket 116 to another sprocket 126 on the forward axle. Vertical movements of the forward axle or the rearward axle has no affect upon the tautness or driving capacity of these chains 120 and 124 because of this mounting relationship. The chains are capable of limited twist so that pivoting of the rearward axle with respect to the trunnion or the forward axle with respect to the trunnion, in their transverse planes, does not affect the drive relationship. Drive chain 112 passes around a pair of idler sprockets 130 and 132. Sprocket 130 is mounted to an adjusting plate 131 which is forwardly and rearwardly adjustable with respect to frame 12 to obtain optimum tightness on the chain.

In operation, the vehicle can be employed with or without the additional attachable tracks 150. If used, one track is extended around wheels 34 and 42 (FIG. 1) and connected at seam 152, and a like track is extended around wheels 32 and 40. Each is kept aligned on the tires by two series of tire straddling inwardly projecting protrusions 153 and 155. Such tracks are particularly advantageous in mud and snow, or on ice. The vehicle can alternatively be employed without these tracks. On snow or ice the front tire can be placed in a receiving pocket 19 of a ski 21.

In rough terrain, the forward and rearward axles of the tandem axle assembly adapt readily to the terrain conditions by shifting upwardly and downwardly with respect to each other about central pivot shaft 98, and each axle tilts with respect to the other wheel on that axle. Furthermore, on curves or corners, the vehicle can be leaned in a manner similar to a conventional scooter or motorcycle for maximum stability.

Additional advantages may occur to those having ordinary skill in this art upon studying the foregoing description. It is also conceivable that certain minor details of construction could be modified within the concept presented. Hence, the scope of the invention is intended to be limited only by that of the appended claims and the reasonably equivalent structures to those defined therein.

I claim:
1. A tandem axle, tiltable, cycle vehicle comprising: a rigid passenger support frame having a steerable front wheel assembly; a tandem rear axle assembly having a forward axle unit and a rearward axle unit under the rear of said frame; each of said axle units having an axle shaft with wheels on opposite ends thereof, and a bearing sleeve on each of said axle shafts; a trunnion extending forwardly from the rear axle bearing sleeve to the front axle bearing sleeve; mounting means affixing the central portion of said trunnion to said frame; said mounting means having a transverse pivot shaft means to allow said axle units to shift vertically in opposite manner to each other; coaxial bearing means secured to the central portion of each of said sleeves and directed towards each other and pivotally supporting the ends of said trunnion to permit independent vertical shifting of each of said axles about the axis of said bearing means and in planes transverse to said axis; resilient biasing means on opposite sides of both ends of said trunnion and of both end portions of each sleeve and disposed between the corresponding trunnion and sleeve portion, to maintain the axles generally in the same horizontal plane while allowing tilting thereof against the bias of said biasing means; and power drive means to said axle units.

2. A tandem axle, tiltable, cycle-type driven vehicle comprising: a rigid passenger support frame having a steerable front wheel assembly; a tandem rear axle assembly having a forward axle unit and a rearward axle unit under the rear of said frame; each of said axle units having an axle shaft with wheels on opposite ends thereof, and a bearing sleeve on each of said axle shafts; a trunnion extending forwardly from the rearward axle bearing sleeve to the forward axle bearing sleeve; mounting means affixing the central portion of said trunnion to said frame; coaxial bearing means secured to the central portion of each of said sleeves and directed toward each other and pivotally supporting the ends of said trunnion to permit vertical shifting of each end of each of said axles about the axis of said bearing means; resilient biasing means on opposite sides of both ends of said trunnion and of both end portions of each sleeve and disposed between the corresponding trunnion and sleeve portion to maintain the axles generally in the same horizontal plane, while allowing tilting thereof against the bias of said biasing means; and power drive means to said axle units.

3. A tandem axle, tiltable, cycle-type driven vehicle comprising a rigid passenger support frame having a steerable front wheel assembly; a tandem rear axle assembly having at least a forward axle unit and a rearward axle unit under the rear of said frame; each of said axle units having an axle shaft with wheels on opposite ends thereof, and a bearing sleeve on each said axle shaft; a trunnion extending forwardly from the rearward axle bearing sleeve to the forward axle bearing sleeve; mounting means affixing the central portion of said trunnion to said frame; said mounting means having a transverse pivot shaft to allow said axle units to shift vertically opposite to each other; coaxial bearing means secured to the central portion of each of said sleeves and directed toward each other and pivotally supporting the ends of said trunnion to permit vertical shifting of each end of each of said axles about the axis of said bearing means; resilient biasing means on opposite sides of both ends of said trunnion and of both end portions of each sleeve and disposed between the corresponding trunnion and sleeve portions to maintain the axles generally in the same horizontal plane while allowing tilting thereof against the bias of said biasing means; power drive means to said axle units, including an engine with output sprocket means; intermediate sprocket means mounted on said transverse pivot axis; drive chain means between said output and intermediate sprocket means; sprocket means on said forward axle; sprocket means on said rearward axle; and drive chain means from said intermediate sprocket means to said forward axle and rearward axle sprocket means.

4. A motor driven cycle comprising: a frame; steerable front end suspension means under said frame; rear end suspension and drive means under said frame, being an H-shaped suspension unit; the legs of said H including wheel mounting axles, and the cross bar being a trunnion; a swivel connection between each leg and the cross bar, with resilient restraint means restraining swivel action therebetween; said resilient restraint means including a pair of counteracting distortable biasing means astraddle each end of said trunnion and each biasing means having one end secured to a corresponding end of the trunnion and the other end thereof secured to the adjacent axle and operable to control and limit twist of each axle with respect to said trunnion; pivot means mounting a central portion of said trunnion to said frame on a transverse pivot axis; seat means on said frame; and engine means on said frame operably connected to said rear end suspension and drive means.

5. The cycle in claim 4 wherein said legs include forward and rearward axle bearing sleeves receiving said axles; said restraint means includes a first pair of fixed abutments astraddle and secured to the forward end of said trunnion, a pair of fixed abutments on said forward sleeve, and a pair of resilient elements between said trunnion abutments and said forward sleeve abutments; a second pair of fixed abutments astraddle and secured to the rearward end of said trunnion, a pair of fixed abutments on said rearward sleeve, and a second pair of resilient elements between said rearward trunnion abutments and said rear sleeve abutments.

References Cited
UNITED STATES PATENTS

| | | | |
|---|---|---|---|
| 2,236,696 | 4/1941 | Peterman | 180—22 |
| 2,246,609 | 6/1941 | Townsend | 280—111 |
| 3,292,943 | 12/1966 | Crockett | 280—111 |

A. HARRY LEVY, *Primary Examiner.*